US009600869B2

(12) United States Patent
Chiang et al.

(10) Patent No.: US 9,600,869 B2
(45) Date of Patent: Mar. 21, 2017

(54) IMAGE EDITING METHOD AND SYSTEM

(71) Applicant: Cyberlink Corp., Shindian, Taipei (TW)

(72) Inventors: Chia-En Chiang, New Taipei (TW); Ho-Chao Huang, New Taipei (TW); Chia-Chen Kuo, Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 31 days.

(21) Appl. No.: 14/049,413

(22) Filed: Oct. 9, 2013

(65) Prior Publication Data
US 2014/0270544 A1 Sep. 18, 2014

Related U.S. Application Data

(60) Provisional application No. 61/781,964, filed on Mar. 14, 2013.

(51) Int. Cl.
G06K 9/62 (2006.01)
G06T 5/00 (2006.01)
G06T 3/00 (2006.01)
G06T 7/12 (2017.01)
G06T 7/194 (2017.01)

(52) U.S. Cl.
CPC ............ *G06T 5/005* (2013.01); *G06T 3/0093* (2013.01); *G06T 7/12* (2017.01); *G06T 7/194* (2017.01)

(58) Field of Classification Search
None
See application file for complete search history.

(56) References Cited

U.S. PATENT DOCUMENTS

| 6,266,054 B1 | 7/2001 | Lawton et al. |
| 6,587,592 B2 | 7/2003 | Georgiev et al. |
| 6,987,520 B2 | 1/2006 | Criminisi et al. |
| 7,012,624 B2 | 3/2006 | Zhu et al. |
| 7,548,659 B2 | 6/2009 | Ofek et al. |
| 7,605,821 B1 | 10/2009 | Georgiev |
| 7,747,107 B2 | 6/2010 | Avidan et al. |
| 7,755,645 B2 | 7/2010 | Sun et al. |
| 7,778,445 B2 | 8/2010 | Au |

(Continued)

OTHER PUBLICATIONS

Zhongyu Xu et al, Image Inpainting Algorithm Based on Partial Differential Equation, IEEE 2008.*

(Continued)

*Primary Examiner* — Mark Roz
(74) *Attorney, Agent, or Firm* — McClure, Qualey & Rodack, LLP

(57) ABSTRACT

In one embodiment, an image editing method, comprising: defining a region as a foreground object and a remaining region as background; applying an image warping process to a predefined object region, wherein a distortion to at least the remaining region occurs based on the image warping process applied to the predefined object region; responsive to the image warping process, determining a region to be repaired, the region to be repaired comprising a missing background; repairing the region to be repaired based on an inpainting process; and generating a repaired image by combining the predefined object region to which the image warping process is applied, one or more non-distorted regions, and the repaired region.

12 Claims, 9 Drawing Sheets

(56) References Cited

U.S. PATENT DOCUMENTS

| 7,991,224 B2 | 8/2011 | Andrew et al. |
| 2006/0045372 A1 | 3/2006 | Wang et al. |
| 2008/0170807 A1* | 7/2008 | Kokemohr ............. G06T 5/005 |
| | | 382/294 |
| 2011/0103706 A1 | 5/2011 | Jeong et al. |

OTHER PUBLICATIONS

A. Criminisi et al. "Region Filling and Object Removal by Exemplar-Based Image Inpainting" IEEE Transactions on Image Processing, vol. 13, No. 9, Sep. 2004.
Sun et al. "Image Completion with Structure Propagation" Apr. 27, 2005.
Harald Grossauer, "A Combined PDE and Texture Synthesis Approach to Inpainting" University of Innsbruck, Feb. 4, 2004.
Steve Patterson, "Photoshop CS5 New Features—Content Aware Fill Tutorial" http://www.photoshopessentials.com/photo-editing/cs5/new-features/fill-content-aware/, Apr. 27, 2010.
Bugeau et al. "Combining Texture Synthesis and Diffusion for Image Inpainting" VISAPP 2009—Proceedings of the Fourth International Conference on Computer Vision Theory and Applications, Portugal (2009).
Wu et al. "An Effective Content-Aware Image Inpainting Method" Jul. 14, 2010.
Adobe Photoshop, "Content-Aware Spotting and Filling" http://www.photoshopforphotographers.com/pscs5/downloads/Movie-06.pdf, Apr. 10, 2010.
Zargham et al. "Content-Aware Image Resizing" http://www.stanford.edu/class/ee368/Project_11/Reports/Zargham_Nassirpour_Content_aware_image_resizing_pdf. Jun. 7, 2011.

* cited by examiner

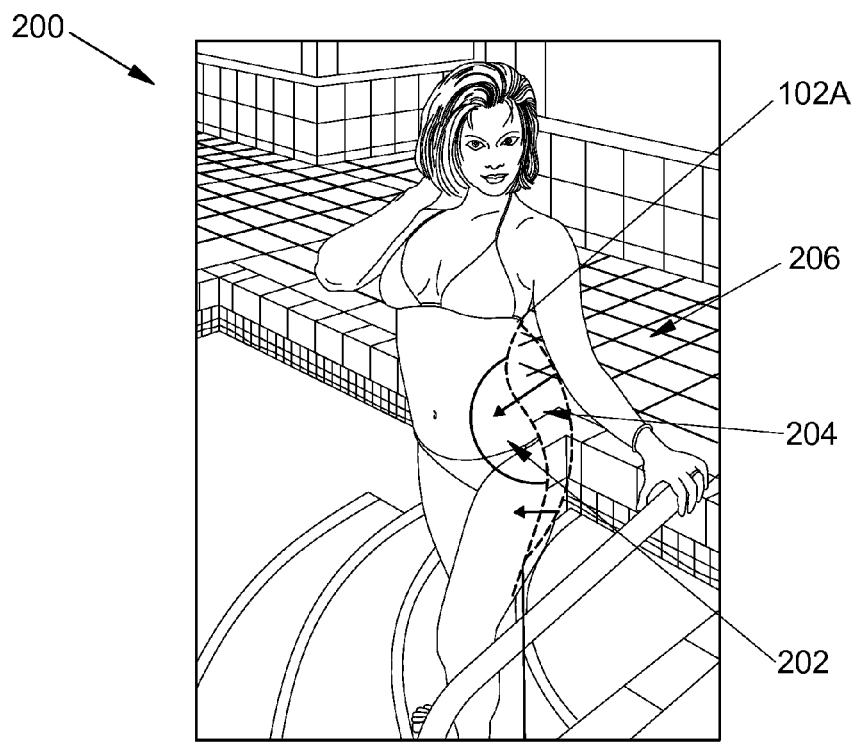
FIG. 2A
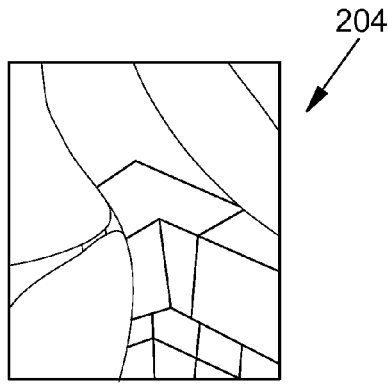 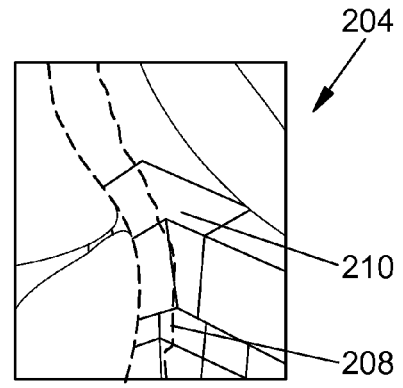
FIG. 2B FIG. 2C

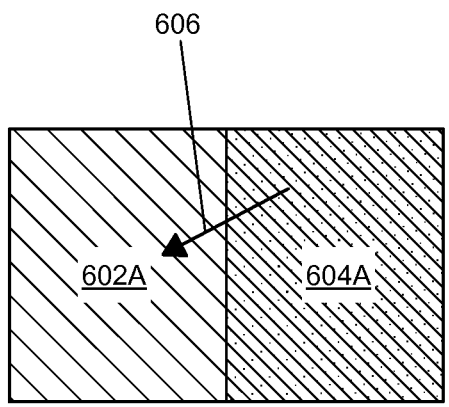
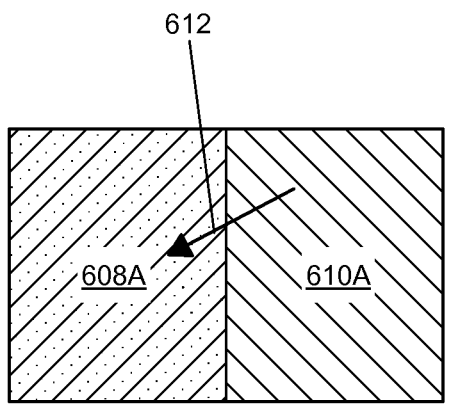
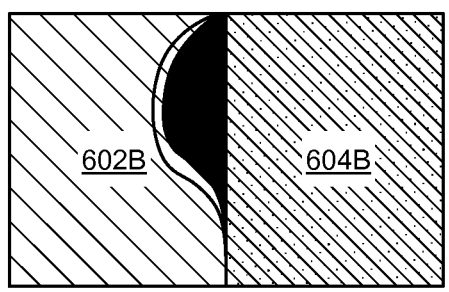
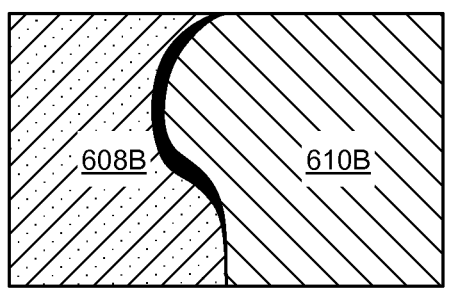
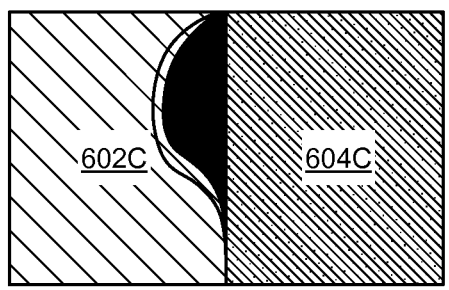
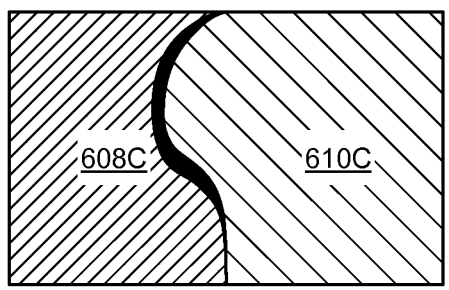
FIG. 6A    FIG. 6B

IMAGE EDITING METHOD AND SYSTEM

CROSS-REFERENCE TO RELATED APPLICATION

This application claims priority to, and the benefit of, U.S. Provisional Patent Application entitled, "Image Editing Method and System," having Ser. No. 61/781,964, filed on Mar. 14, 2013, which is incorporated by reference in its entirety.

TECHNICAL FIELD

The present disclosure is generally related to image processing, and, more particularly, is related to image warping.

BACKGROUND

Methods of image warping are often used in image processing. Warping generally refers to a shape changing of an object. For example, mesh warping implements local image shape transforms by moving a control point in the mesh grid. However, image twist or distortion may be evident when the image is over-adjusted.

SUMMARY

In one embodiment, an image editing method comprises defining a region as a foreground object and a remaining region as background; applying an image warping process to a predefined object region, wherein a distortion to at least the remaining region occurs based on the image warping process applied to the predefined object region; responsive to the image warping process, determining a region to be repaired, the region to be repaired comprising a missing background; repairing the region to be repaired based on an inpainting process; and generating a repaired image by combining the predefined object region to which the image warping process is applied, one or more non-distorted regions, and the repaired region.

In another embodiment, an image editing system comprises a computing device comprising: a memory having executable code; and a processor configured by the executable code to: define a region as a foreground object and a remaining region as background; apply an image warping process to a predefined object region, wherein a distortion to at least the remaining region occurs based on the image warping process applied to the predefined object region; responsive to the image warping process, determine a region to be repaired, the region to be repaired comprising a missing background; repair the region to be repaired based on an inpainting process; and generate a repaired image by combining the predefined object region to which the image warping process is applied, one or more non-distorted regions, and the repaired region.

In another embodiment, an image editing method comprises performing an image warping process on a predefined object region, the image warping process resulting in a distortion; responsive to the image warping process, determining a region to be repaired, the region to be repaired comprising an overlapped region between a region inside an object boundary before the image warping process and a region outside the object boundary after the image warping process; repairing the region to be repaired based on an inpainting process; and generating a repaired image.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2A is a schematic diagram depicting an example image transformation by certain embodiments of image editing methods of an original image comprising foreground and background regions.

FIGS. 2B-2C are schematic diagrams depicting a process of inpainting area decisions performed by certain embodiments of image editing methods on a transformed image.

FIGS. 5-6B are block diagrams illustrating an inpainting process based on an analysis of texture properties in regions associated with a mesh warping process.

DETAILED DESCRIPTION

Figure 1:
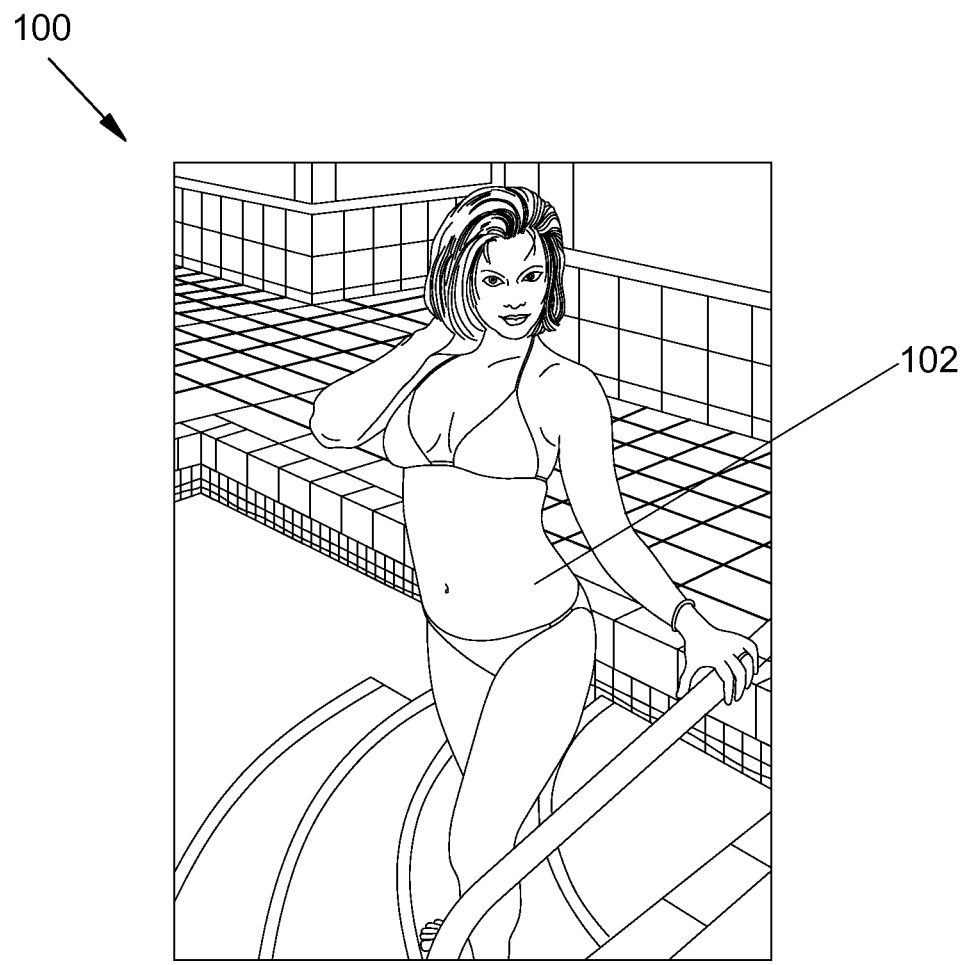
FIG. 1 is a schematic diagram depicting acquisition of an original image comprising foreground and background regions by certain embodiments of image editing methods.

Disclosed herein are certain embodiments of an invention involving image editing systems and methods that use inpainting for image warping processes that may improve the unnatural, distorted regions produced by traditional image warping processes. That is, one or more embodiments of image editing methods use an inpainting based method to restore or repair these distorted regions by analyzing the image content to avoid or mitigate inpainting distorted regions with unwanted pixels as is often the case with conventional inpainting methods.

Reference will now be made in detail to the description of the disclosure as illustrated in the drawings. While the disclosure is described in connection with these drawings, there is no intent to limit it to the embodiment or embodiments disclosed herein. Further, although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Figure 3A:
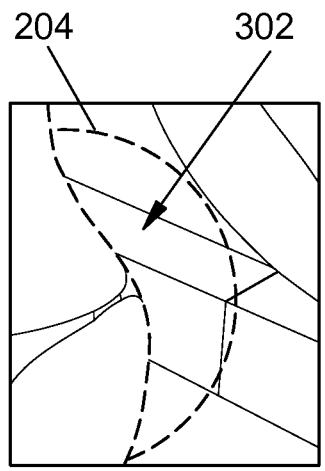
FIGS. 3A and 3B are schematic diagrams depicting a process of inpainting and the resulting image based on inpainting area decisions performed by certain embodiments of image editing methods on a transformed image.
Figure 3B:
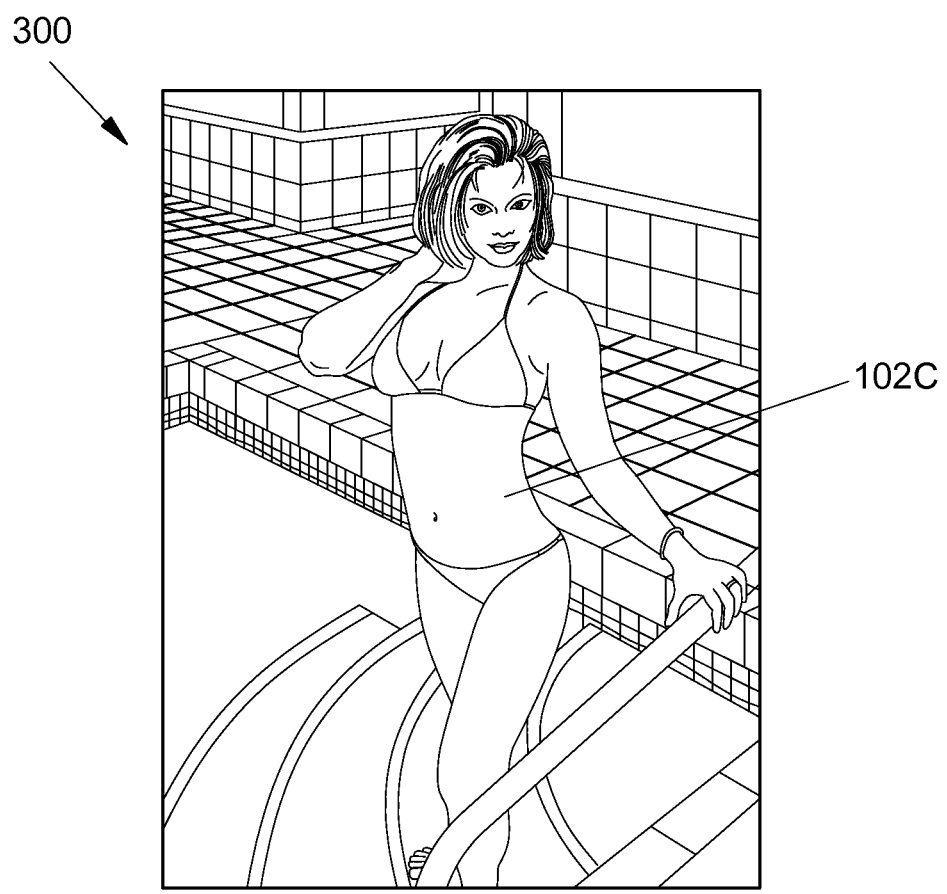
Figure 4:
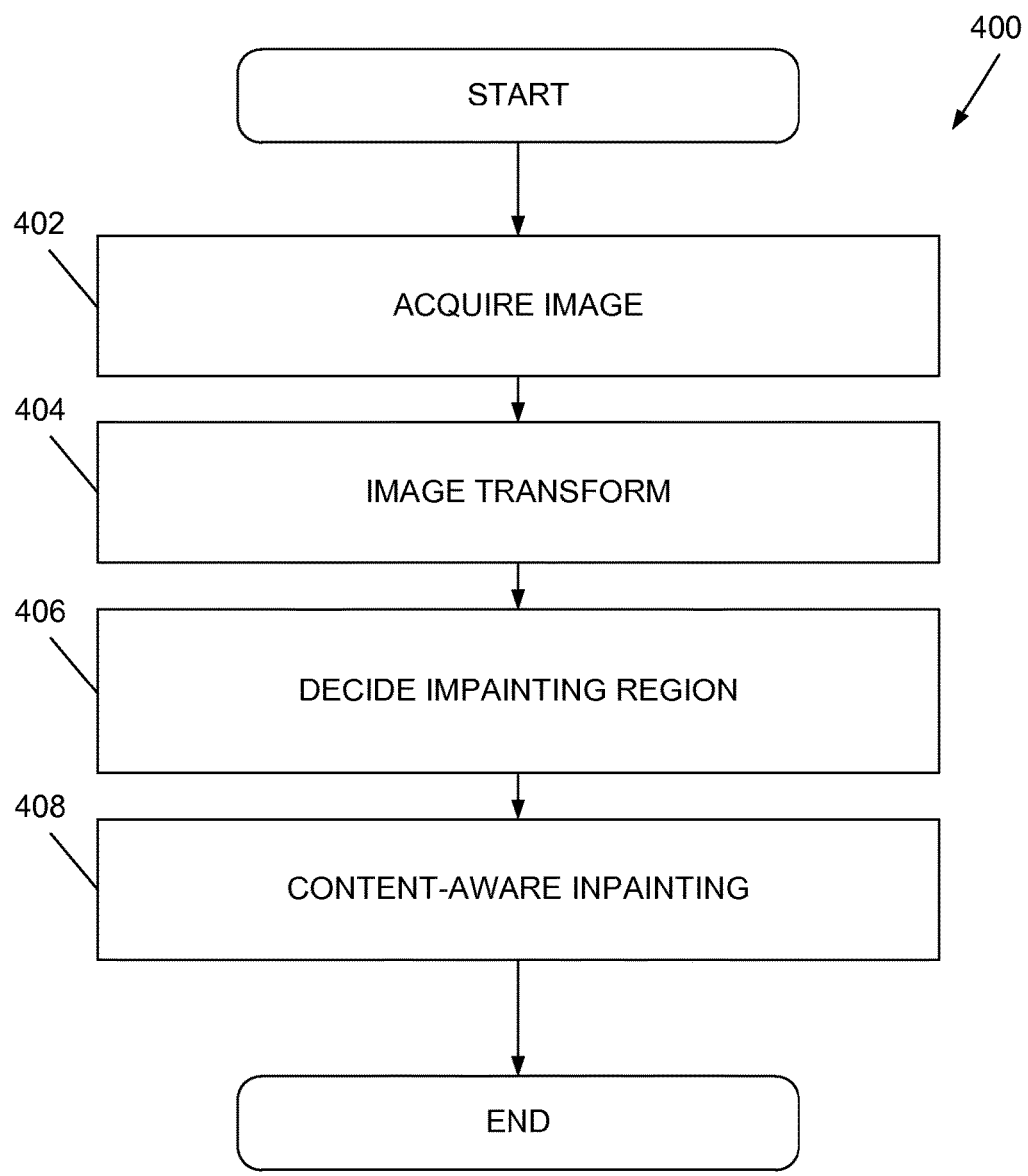
FIG. 4 is a flow diagram depicting an example embodiment of an image editing method.

Attention is directed to FIGS. 1-3B, which schematically illustrate example image processing performed on an image according to an example image editing method embodiment illustrated in FIG. 4. Accordingly, discussion of FIGS. 1-3B ensues in the following in the context of the method embodiment shown in FIG. 4. One having ordinary skill in the art should appreciate in the context of the present disclosure that the example image processing shown and described collectively in association with FIGS. 1-4 is merely illustrative, and that other variations using different, additional, or fewer steps in the process may be utilized for some embodiments. Referring to an embodiment of an image editing method 400 in FIG. 4, an image is acquired (402). The image may have been acquired through any one of a plurality of image capture techniques, such as via video or still image capture. The captured image may be stored in persistent memory for ready access over a wired or wireless network, and/or received via a suitable transmission network (and possibly buffered), such as where an image editing system is implemented as a television or set-top box in a broadband or home network environment, among other network environments. In some embodiments, an image editing system may be incorporated in an image capture device itself. Referring to FIG. 1, shown is a schematic diagram of an image 100 that comprises plural regions, including plural pixel regions of a person 102 standing in a shallow end of a pool. In this example, the person 102 represents one of the foreground regions of the image 100, with the pool environment (e.g., surface tiles) representing parts of the background regions. It should be appreciated by one having ordinary skill in the art that image warping may be applied, at once (e.g., in parallel) or in sequence, to other or additional regions in the foreground, to one or more regions in the background, or a combination of both in any given process.

Referring again to the image editing method 400 depicted in FIG. 4, the method 400 advances to performing an image transform (404). In the example depicted in FIG. 2A, the image transform comprises an image warping process, such as a mesh warping process, among other image warping processes. In other words, the image 100 of FIG. 1 is subject to an image warping process, which may be implemented automatically (e.g., without real-time user intervention) and/or with the interaction of a user (e.g., as part of a user-interactive editing process). One intended goal of the image warping process in this example is to make the person 102 of FIG. 1 appear thinner. The resulting, modified image is denoted as image 200, as noted in FIG. 2A, and shows the person 102A as modified in shape and/or size. For instance, the regions 202 and 204 comprise the regions affected by the warping process in this example. The region 202 comprises an intended, modified or adjusted region of pixels (the subject of the warping process, such as the person's waist, hip, and thigh) and the region 204 comprises an unintended, distorted region of pixels. The distortion (including twisting, as noted by the tiles beyond the perimeter), a common effect of the image warping process, shows the tiles of the region 204 in a somewhat distorted manner, such as a twisting of the tiles into an angled or "L" configuration (as opposed to linear or straight like those tiles extending to the right and left of the person 102A). It should be appreciated within the context of the present disclosure that the distortion may occur to the foreground, background, or a combination of both in some embodiments.

FIGS. 2B and 2C provide a more detailed view of the region 204, and further illustrate a decision or determination pertaining to the appropriate inpainting region (406) of the image editing method 400 (FIG. 4). For instance, in the decision on inpainting region (406), the image editing method 400 determines which regions need to be repaired using certain information. In one embodiment, the image editing method 400 makes this determination based on information resulting from a comparison of the before and after image warping process. For instance, FIG. 2B shows the region 204 subsequent to the implementation of the image warping process, similar to that shown in FIG. 2A, with a focus on the distortion of the pool tiles into an "L" or inward configuration as opposed to linearly extending, without deviation, along a given axis that aligns with pool tiles beyond or to the left (e.g., the person's right) of the person 102A in FIG. 2A. FIG. 2C shows how the region 204 looks prior to an inpainting process (yet illustrates the analysis or decision process to enable an identification of the area in need of repair), where the dashed line 208 represents a pre-inpainting regional boundary, showing the tiles 210 appearing to extend along an axis that aligns with the tiles on the left of the person 102A (FIG. 2A) without any inward or other deviation or distortion.

The aforementioned comparison may further comprise an analysis by the image editing system of one or more features of the pre- and post-image warping image. In other words, the analysis may consider features of (or associated with) those pixels present in regions 202 and 204, or in some embodiments, a subset of those regions and/or additional regions (e.g., outside of the regions 202 and 204, such as region 206 (FIG. 2A)). For purposes of illustration, the analysis is considered as occurring at least between the modified region 202 and the distorted region 204, as well as region 206. In one embodiment, the analysis performed by the image editing system comprises analyzing one or more of textures, details, or edge direction in the image of the modified 202 and distorted regions 204. In some embodiments, the analysis comprises an analysis of one or more of image warping direction (e.g., in this example, the warping direction is inward in achieving the "thinning" of the person 102A, as represented in FIG. 2A by the two unreferenced arrowheads extending from the dotted line of the region 206 and into the waist and hip and thigh regions of the person 102A), or user input information such as user-specified regions and/or repair direction to counter the distortion (e.g., repair the region 204) resulting from the image warping process. The repair direction may be determined by considering the relationship between the foreground and background regions after image warping. In some embodiments, the warping direction is in the same direction as the repair direction, and in some embodiments, the warping direction is different from (e.g., opposite) the repair direction. In some embodiments, the analysis may comprise an analysis of differences in data associated with the progression of an image warping algorithm underlying the image warping process, with corresponding information comprising one or more of movement of control points or number of reference points (e.g., the mesh points during a mesh warping process that guide the image warping process).

Note that in some embodiments, the image editing system may receive other information that may be used in addition to or in lieu of the comparison/analysis process, such as user input information (e.g., actual user input corresponding to selection of a particular region, editing instructions, etc.).

Referring again to the image editing method 400 (FIG. 4), the next step is to implement a content aware inpainting (408). Referring again to FIG. 2A, the region 204 (outlined by the dashed line) indicates the destination of the inpainting. The region 206 (which in FIG. 2A includes the area to the right of the solid reference lines that extends to approximately the 2:00 (coincident with the reference line for 102) and 6:00 position of the page, using a clock-face analogy, and including the area to the right of the dashed line on the right-hand side of the figure running from the bathing suit strap to the thigh area of the person 102A) indicates the possible source of pixels for the inpainting. The image warping direction (e.g., indicated by the two nonreferenced arrowheads extending in the primarily left direction from the dashed line in FIG. 2A) may indicate the source area. In some embodiments, other information may serve to exclude certain regions as a source of inpainting. For instance, the color and texture information may serve to exclude the person's arm and the handrail from the source. According to the image warping direction, the image editing method 400 may learn that the user's intention is to exclude the flesh or skin pixel regions, and because the arm has the same color (e.g., skin color) as the waist and hip/thigh, the image editing method 400 may exclude the arm despite being located in the source region 206. Similarly, for the handrail, because the image editing method 400 learns that it is the tile that needs to be restored (e.g., in region 204), the handrail is also excluded despite being located in the source region 206.

As shown in FIG. 3A, the region 204 has been subject to an inpainting, where the image editing system has repaired the distortion (e.g., the tiles now appear straight or linear, as opposed to the "L" configuration), as shown by the repaired region 302. In contrast to traditional inpainting mechanisms, the image editing method 400 applies inpainting based on one or more of the aforementioned information derived from a comparison of the pre- and post-image warping regions and/or user input. In this example, the inpainting uses the tiles of the regions 204 and 206 to inpaint the area of the distortion. In one embodiment, the inpainting may be implemented on the basis of directional information comprising one or more of relative distance or moving direction of the modified region 202 (FIG. 2A) and/or the distorted region 204 (FIG. 2A). Such directional information may further comprise user input-type information. For instance, if the user implements the image warping process using an input device (e.g., mouse placing a cursor on the affected regions 202, 204, etc.), then the directional information may comprise a value indicating the direction of the mouse. In other words, an embodiment of the image editing system may apply a repair that counters (e.g., is opposite) the image warping direction, where if the warping was in an inward direction (e.g., to the region 202), the directional information runs counter the inward direction and hence comprises the pool tile pixels and accompanying information. Hence, the repair involves inpainting the distorted area with the tile features of regions 204 and 206 (and not the person's features) in a similar direction (and not in an inward or "L" direction).

FIG. 3B shows the final outcome 300 of the implementation of the image editing method 400, including the thinner person 102B and repaired region, which may be presented to a display for viewing or other device (e.g., storage device for further processing). In some embodiments, as mentioned above, the presentation to a display may be ongoing throughout implementation of the method 400, or in some embodiments, during a subset of the processing or in some embodiments, after the method 400 is complete.

Figure 5:
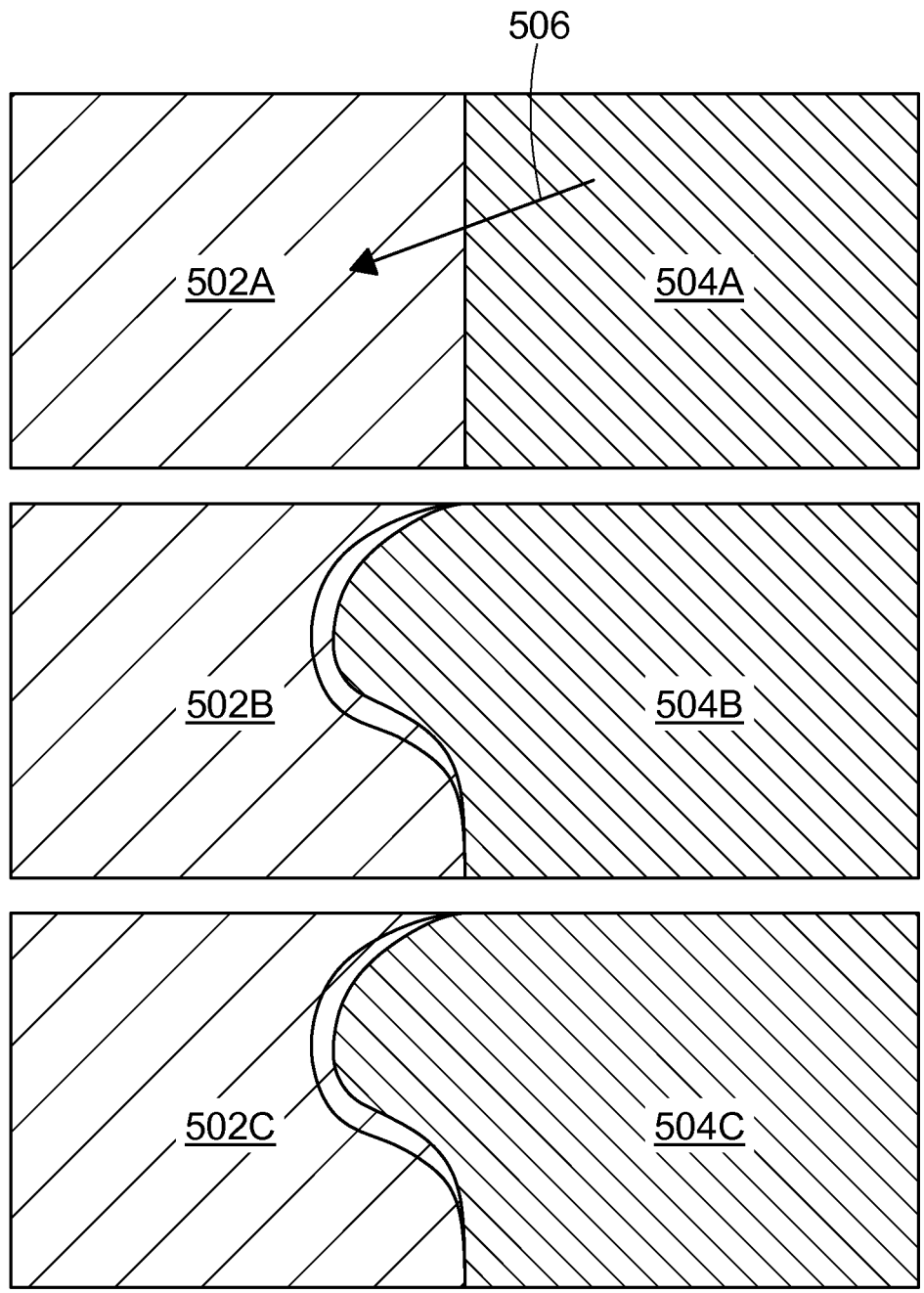

Referring now to FIGS. 5-6B, shown are some further examples of how certain embodiments of image editing systems use information such as textures and/or color to influence the inpainting. With regard to FIG. 5, shown are two different color regions 502 (e.g., 502A, 502B, and 502C in different stages associated with image warping and subsequent processing) and 504 (e.g., 504A, 504B, and 504C in different stages associated with image warping and subsequent processing) of the same texture. Assume color regions 502 and 504 are different colors. An arrowhead 506 refers to the image warping direction, which extends from color region 504A to color region 502A. The regions 502B and 504B, similar to the stage of processing in FIG. 2B, show a stage in the process after image warping yet before inpainting. The regions 502C and 504C, similar to the stage of processing in FIG. 2C, shows a stage in the process after image warping, before inpainting, and after analysis. When regions affected by image warping are both flat (e.g., non-textured, plain colors), as in the depicted examples of FIG. 5, inpainting may not be needed since typically no distortion is generated.

With reference to FIGS. 6A-6B, shown are regions of different texture and color. For instance, with regard to FIG. 6A, shown is a non-textured, first color region 602 (e.g., 602A, 602B, and 602C in different stages of processing associated with pre- and post image warping) and textured, second color region 604 (e.g., 604A, 604B, and 604C in different stages of pre- and post image warping), where the image warping direction is shown by arrowhead 606 (from region 604A to 602A). In other words, the image warping direction is from the textured region 604A to the non-textured region 602A. In general, when one of the regions affected by image warping (e.g., mesh warping) is textured, the texture region tends to be distorted and hence needs repairing. Here, area 605 between the two regions 602B and 604B represents the region in need of repair. Region 604C represents a possible source of inpainting.

In FIG. 6B, shown is textured, first color region 608 (e.g., 608A, 608B, and 608C in different stages associated with pre- and post image warping) and non-textured, second color region 610 (e.g., 610A, 610B, and 610C in different stages associated with pre- and post image warping), where the image warping direction is shown by arrowhead 612. The image warping direction in this case is opposite that of FIG. 6A, namely, from the non-textured region 610A to the textured region 608A.

Note that the examples depicted in FIGS. 1-3B more resemble the examples illustrated in FIG. 6A (i.e., the image warping is performed from the textured (e.g., tiled) region to the flat (skin) region).

Figure 7:
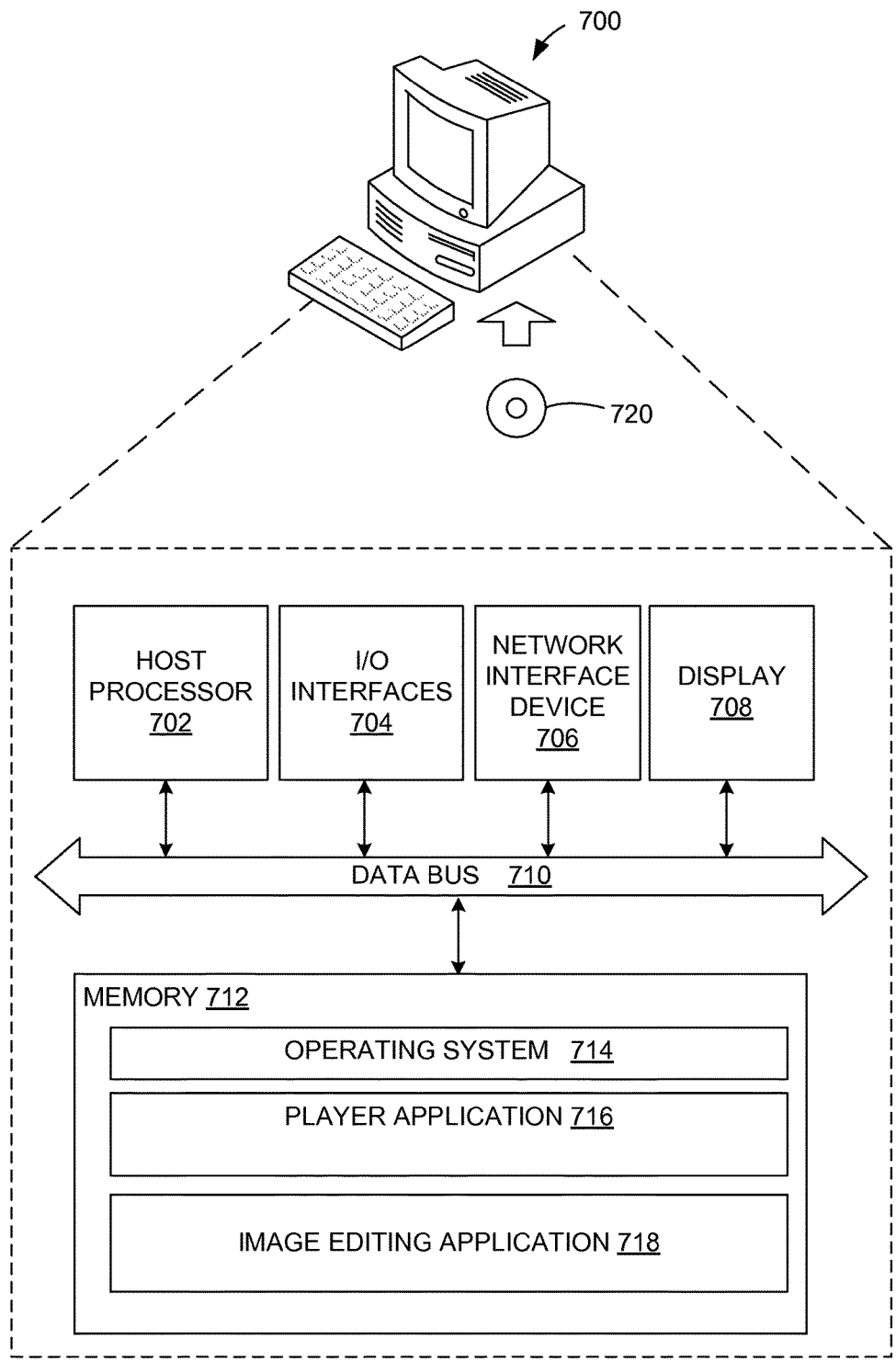
FIG. 7 is a block diagram of an example embodiment of an image editing system.

Having described and illustrated an example image editing method in association with FIGS. 1-4, attention is directed now to FIG. 7, which illustrates an embodiment of an image editing system 700. In one embodiment, an image editing system may embody the entirety of the components shown in FIG. 7, or in some embodiments, a portion thereof, and/or additional components to those depicted in FIG. 7. Though depicted as a computing device embodied as a computer, the image editing system 700 may comprise any one of a plurality of computing devices, including a dedicated player appliance, set-top box, laptop, computer workstation, cellular phone, smart phone, personal digital assistant (PDA), handheld or pen based computer, image capture device, embedded appliance, or other communication (wired or wireless) device for enabling playback or processing of multimedia content from a computer readable medium. In some embodiments, an image editing system may be implemented on a network device located upstream of the computer, such as a server, router, etc., or implemented with similar functionality distributed among plural devices (e.g., in a server device and the computer). An upstream network device may be configured with similar components, and hence discussion of the same is omitted for brevity.

The image editing system 700 may, for instance, comprise a host processor 702, one or more input/output interfaces 704 (I/O interfaces), a network interface device 706, and a display 708 connected across a data bus 710. The image editing system 700 may further comprise a memory 712 that includes an operating system 714 and application specific software, such as a player application 716 and an image editing application 718, each embodied as executable code. The player application 716 may be implemented as a software program configured to read and play back content residing on a disc 720 (or from other high definition video sources) according to the specifications defined by standards such as the Blu-ray Disc format specification, HD-DVD, SD-DVD, CD, etc. In one example operation, once the disc 720 or other video source (e.g., over a wired and/or wireless medium) is received by the player application 716, the player application 716 can execute and/or render one or more user interactive programs residing on the disc 720.

Such a user interactive program can include, but is not limited to, a movie introductory menu or other menus and user interactive features allowing a user to enhance, configure, and/or alter the viewing experience, choose playback configuration options, select chapters to view within the disc 720, in-movie user interactive features, games, or other features as should be appreciated. Note that the player application 716 may also be implemented, in whole or in part, as a software program residing in mass storage, the disc 720, a network location, or other locations, as should be appreciated by one having ordinary skill in the art.

The image editing application 718 comprises suitable executable code to transform an image according to one or more of a plurality of known image warping algorithms, determine (e.g., identify) a distorted region (e.g., based on comparisons between pre- and post-image warping processing and/or via user input), repair a region based on an inpainting process, and/or present the resultant image for display and/or storage. In some embodiments, the functionality of the player application 716 and the image editing application 718 may be combined, or in some embodiments, further distributed among additional software modules.

The host processor 702 may include any custom made or commercially available processor, a central processing unit (CPU) or an auxiliary processor among several processors associated with the image editing system 700, a semiconductor based microprocessor (in the form of a microchip), one or more ASICs, a plurality of suitably configured digital logic gates, and other well-known electrical configurations comprising discrete elements both individually and in various combinations to coordinate the overall operation of the computing system.

The memory 712 may include any one or a combination of volatile memory elements (e.g., random-access memory (RAM, such as DRAM, and SRAM, etc.)) and nonvolatile memory elements (e.g., ROM, hard drive, tape, CDROM, etc.). The memory 712 typically comprises the native operating system 714, one or more native applications, emulation systems, or emulated applications for any of a variety of operating systems and/or emulated hardware platforms, emulated operating systems, etc. For example, the applications may include application specific software stored on a computer readable medium for execution by the host processor 702 and may include the player application 716, the image editing application 718, and their corresponding constituent components. One of ordinary skill in the art will appreciate that the memory 712 may, and typically will, comprise other components which have been omitted for purposes of brevity.

Input/output interfaces 704 provide any number of interfaces for the input and output of data. For example, where the image editing system 700 comprises a personal computer, these components may interface with a user input device, which may be a keyboard, a mouse, or voice activated mechanism. Where the image editing system 700 comprises a handheld device (e.g., PDA, mobile telephone), these components may interface with function keys or buttons, a touch sensitive screen, a stylus, a voice activated mechanism, etc. The input/output interfaces 704 may further include one or more disc drives (e.g., optical disc drives, magnetic disc drives) to enable playback of multimedia content residing on the computer readable medium 720.

The network interface device 706 comprises various components used to transmit and/or receive data over a network environment. By way of example, the network interface device 706 may include a device that can communicate with both inputs and outputs, for instance, a modulator/demodulator (e.g., a modem), wireless (e.g., radio frequency (RF)) transceiver, a telephonic interface, a bridge, a router, network card, etc. The image editing system 700 may further comprise mass storage (not shown). For some embodiments, the mass storage may include a data structure (e.g., database) to store and manage data. Such data may comprise, for example, editing files which specify special effects for a particular movie title.

The display 708 may comprise a computer monitor or a plasma or other screen for a PC or a liquid crystal display (LCD) on a hand held device, for example. In some embodiments, the display 708 may be separate from the image editing system 700.

In the context of this disclosure, a "computer-readable medium" stores one or more programs and data for use by or in connection with the instruction execution system, apparatus, or device. The computer readable medium is non-transitory, and may be, for example, but not limited to, an electronic, magnetic, optical, electromagnetic, infrared, or semiconductor system, apparatus, or device. More specific examples (a non-exhaustive list) of the computer-readable medium may include, in addition to those set forth above, the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

Figure 8:
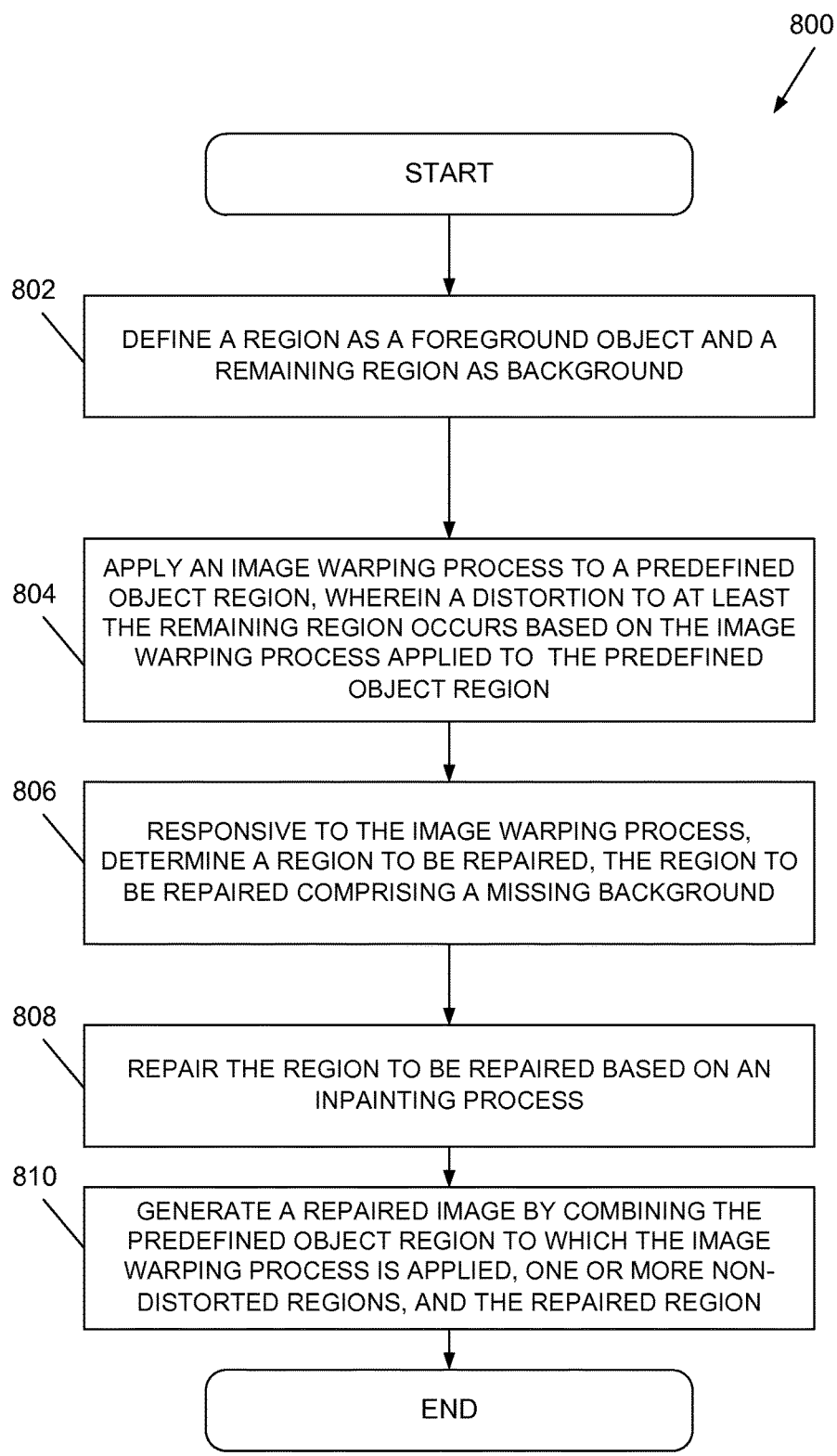
FIG. 8 is a flow diagram depicting another example embodiment of an image editing method.

Having provided a detailed description of certain embodiments of image editing systems, one embodiment of an image editing method 800, implemented by the image editing system 700 or a portion thereof (e.g., the processor) and depicted in FIG. 8, comprises defining a region as a foreground object and a remaining region as background (802). In some embodiments, the foreground object may be defined by user input, or by detecting a sharpness of edges in an image. For instance, a region surrounded by edges with sharpness values higher than an average sharpness value of the image may serve as the region of the foreground object. In some embodiments, the foreground object may be defined by detecting skin tone in the image, wherein a skin tone region is the region of foreground object. In some embodiments, the foreground object may be defined as a group of consecutive pixels that shares similar properties and represents the same object of interest in an actual scene. Properties may include one or any combination of the following properties derived from image content analysis: color, brightness, texture, edge, gradient or sharpness.

The method 800 further comprises applying an image warping process to a predefined object region, wherein a distortion to at least the remaining region occurs based on the image warping process applied to the predefined object region (804). In some embodiments, the application of the image warping process may comprise manipulating an image corresponding to the predefined object region such that coordinates of pixels are respectively mapped from a source location to a destination location of the image, wherein coordinate changes of pixels are defined by one or any combination of global or local transformation based on translation, rotation, scale, affine, or perspective. A pixel value of the destination location may be interpolated from the mapping of the pixels from the source location. In some embodiments, the distortion resulting from the image warping process may comprise local distortion, and the image warping process may further comprise partitioning the image into polygons defined with a plurality of control points, each control point located on the respective polygon vertex, and each polygon is transformed using the mapping from translation, rotation, scale, affine, perspective or any combination thereof according to one or a combination of movement or displacement of the control points, wherein a pixel value of each destination polygon is interpolated from its source polygon mapping location. The image warping process may be a mesh warping process, and the image may be partitioned into rectangle shape grids with each of the control points located on the rectangle vertex.

The method 800 further comprises, responsive to the image warping process, determining a region to be repaired (e.g., herein also a need to be repaired region), the region to be repaired comprising a missing background (806). In some embodiments, the determining comprises examining an object boundary before and after the image warping process, wherein an overlapped region between the region inside the object boundary before the image warping process and a region outside the object boundary after the image warping process are defined as the missing background to be repaired.

The method 800 further comprises repairing the region to be repaired based on an inpainting process (808). In some embodiments, the inpainting process comprises receiving a reference region and the region to be repaired. For instance, one embodiment of the inpainting process comprises inpainting iteratively through all of the regions to be repaired (e.g., wherein per iteration, the inpainting process starts from a boundary of the regions (e.g., encompassing all of the regions) and the inpainting process derives pixels across the boundary) and calculating (e.g., solving a partial differential equation (PDE) or a weighted average of the pixel values of the reference region) pixel values of the regions to be repaired based on pixel values of the reference region or reference regions. The reference region may be limited to a predefined background region, or a region near a boundary of an object of the predefined object region.

Explaining further, in some embodiments, in the inpainting process, a reference region and a need to be repaired region are received. The inpainting process may iterate through the whole need to be repaired regions, search the reference regions, and determine the possible adjustment for fixing the need to repaired regions. Per iteration, the inpainting process may start from the boundary of the regions, and the process derives a small source block across the boundary. The source block may tag its inner part overlapping with a need to repaired region as invalid. The reference region is searched with one or multiple reference blocks in high visual coherence without comparing the invalid region in a source block. Using the derived reference blocks, the inpainting process determines the possible contents in the invalid region of the source block, and adjusts the invalid region with the contents. The adjustment per iteration may be done in pixel based, which adjusts one pixel in the source block at a time, or in block based, which adjusts the need to repaired pixels in the source block. The need to be repaired pixels which are affected by adjustment may be tagged as distorted but no need to be repaired region. A new boundary may be derived for a next iteration of the inpainting process. The process is finished after all distorted pixels are tagged as no need to be repaired.

The method 800 further comprises generating a repaired image by combining the predefined object region to which the image warping process is applied, one or more non-distorted regions, and the repaired background region (810). Note that in some embodiments, the distortion resulting from the image warping process occurs to a foreground object. In some embodiments, the one or more non-distorted regions include the foreground object, the background, or a combination of both.

Figure 9:
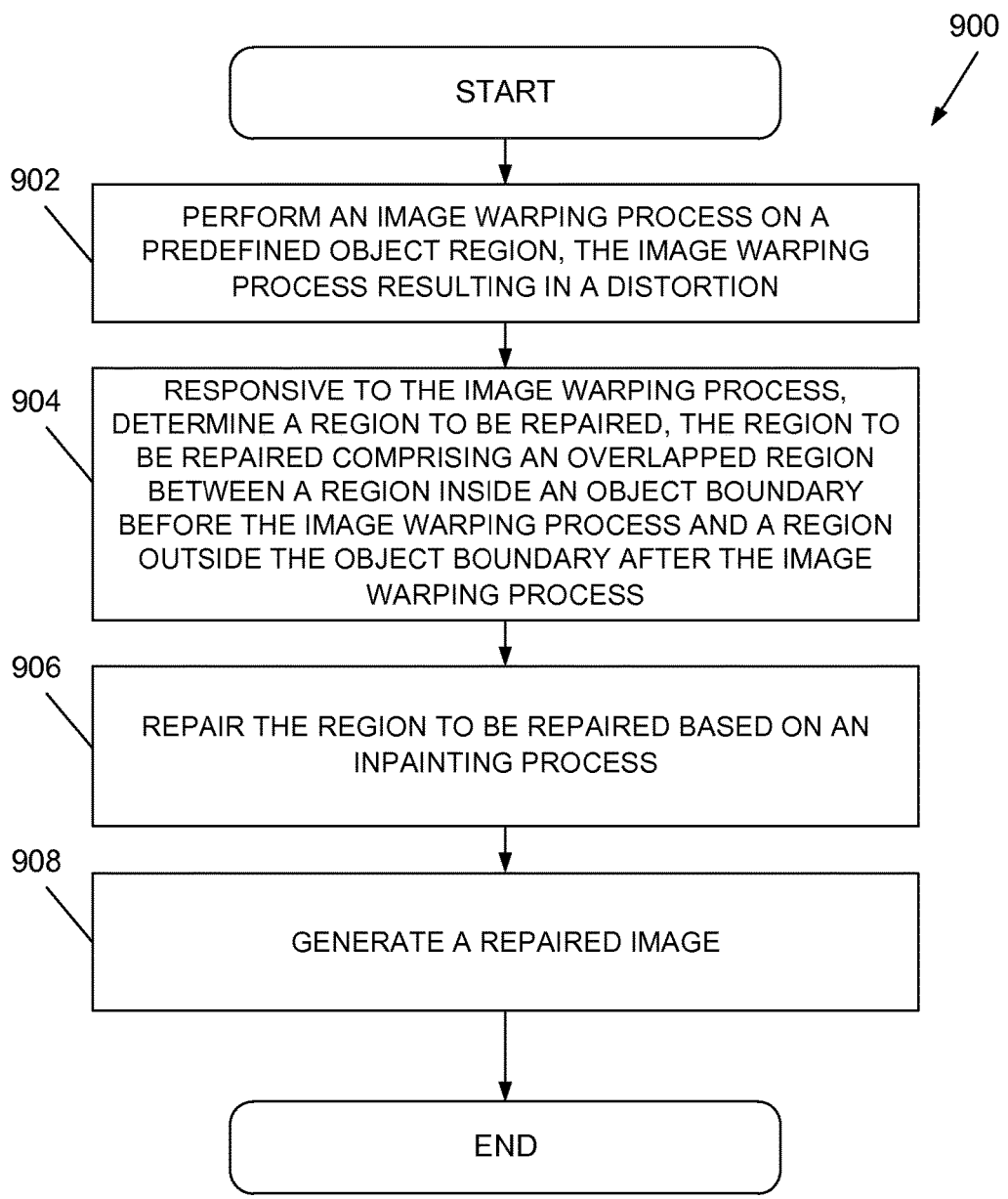
FIG. 9 is a flow diagram depicting another example embodiment of an image editing method.

In view of the foregoing disclosure, it should be appreciated that another embodiment of an image editing method 900, implemented by the image editing system 700 or a portion thereof (e.g., the processor) and depicted in FIG. 9, comprises performing an image warping process on a predefined object region, the image warping process resulting in a distortion (902); responsive to the image warping process, determining a region to be repaired, the region to be repaired comprising an overlapped region between a region inside an object boundary before the image warping process and a region outside the object boundary after the image warping process (904); repairing the region to be repaired based on an inpainting process (906); and generating a repaired image (908).

Any process descriptions or blocks in flow diagrams should be understood as representing modules, segments, or portions of codes which include one or more executable instructions for implementing specific logical functions or steps in the process, and alternate implementations are included within the scope of the embodiments of the present disclosure in which functions may be executed out of order from that shown or discussed, including substantially concurrently or in reverse order, and/or with one or more functions omitted in some embodiments, depending on the functionality involved, as would be understood by those reasonably skilled in the art of the present disclosure. Also, though certain architectures are illustrated in the present disclosure, it should be appreciated that the methods described herein are not necessarily limited to the disclosed architectures.

In addition, though various delineations in software logic (e.g., executable instructions or code) have been depicted in the accompanying figures and described in the present disclosure, it should be appreciated that one or more of the functions performed by the various logic described herein may be combined into fewer software modules and or distributed among a greater number. Further, though certain disclosed benefits/advantages inure to certain embodiments of image editing systems, it should be understood that not every embodiment necessarily provides every benefit/advantage.

In addition, the scope of certain embodiments of the present disclosure includes embodying the functionality of certain embodiments of image editing systems in logic embodied in hardware and/or software-configured mediums. For instance, though described in software configured mediums, it should be appreciated that one or more of the image editing functionality described herein may be implemented in hardware or a combination of both hardware and software.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. An image editing method, comprising:
   performing an image warping process on a predefined object region, the image warping process corresponding to shape change of the predefined object region, the image warping process further resulting in unintended warping of a region external to the predefined object region before the image warping process;
   responsive to the image warping process, determining a region to be repaired containing the unintended warping by comparing a pre-object warping image with a post-object warping image, wherein the region to be repaired comprises an overlapped region between a region inside an object boundary of the pre-object warping image and a region outside a new object boundary of the post-object warping image;
   repairing the region to be repaired based on an inpainting process; and
   generating a repaired image.

2. The image editing method of claim 1, wherein the shape change comprises reduction in size of at least a portion of the predefined objection region.

3. The image editing method of claim 1, wherein applying the image warping process comprises manipulating an image corresponding to the predefined object region such that coordinates of pixels are respectively mapped from a source location to a destination location of the image, wherein coordinate changes of pixels are defined by one or any combination of global or local transformation based on translation, rotation, scale, affine, or perspective.

4. The image editing method of claim 3, wherein a pixel value of the destination location is interpolated from the mapping of the pixels from the source location.

5. The image editing method of claim 3, wherein the region to be repaired resulting from the image warping process comprises local distortion, and the image warping process further comprises partitioning the image into polygons defined with a plurality of control points, each control point located on a respective polygon vertex, and each polygon is transformed using the mapping from translation, rotation, scale, affine, perspective or any combination thereof according to one or a combination of movement or displacement of the control points, wherein a pixel value of each destination polygon is interpolated from its source polygon mapping location.

6. The image editing method of claim 5, wherein the image warping process is a mesh warping process, and the image is partitioned into rectangle shape grids with each of the control points located on a rectangle vertex.

7. The image editing method of claim 1, wherein the inpainting process comprises receiving a reference region and the region to be repaired, wherein the inpainting process further comprises:
   inpainting iteratively through all of the regions to be repaired; and
   calculating pixel values of the regions to be repaired based on pixel values of the reference region.

8. The image editing method of claim 7, wherein per iteration, the inpainting process starts from a boundary encompassing all of the regions, the inpainting process deriving pixels across the boundary.

9. The image editing method of claim 7, wherein the reference region is limited to a predefined background region.

10. The image editing method of claim 7, wherein the reference region is limited to a region near a boundary of an object of the predefined object region.

11. The image editing method of claim 7, wherein the calculating comprises solving a partial differential equation (PDE).

12. The image editing method of claim 7, wherein the calculating comprises a weighted average of the pixel values of the reference region.

* * * * *